(12) United States Patent
Laine et al.

(10) Patent No.: US 8,764,939 B2
(45) Date of Patent: Jul. 1, 2014

(54) METHOD FOR IMPROVING THE REMOVAL OF WATER

(75) Inventors: Janne Laine, Espoo (FI); Tero Taipale, Espoo (FI); Isko Kajanto, Espoo (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 13/823,274

(22) PCT Filed: Sep. 14, 2011

(86) PCT No.: PCT/FI2011/050789
§ 371 (c)(1),
(2), (4) Date: Mar. 14, 2013

(87) PCT Pub. No.: WO2012/035205
PCT Pub. Date: Mar. 22, 2012

(65) Prior Publication Data
US 2013/0180679 A1    Jul. 18, 2013

(30) Foreign Application Priority Data
Sep. 17, 2010 (FI) ..................... 20105959

(51) Int. Cl.
*D21F 11/00* (2006.01)
(52) U.S. Cl.
USPC ........................................ 162/141
(58) Field of Classification Search
USPC ................. 162/141, 158, 175, 164.6
See application file for complete search history.

(56) References Cited

U.S. PATENT DOCUMENTS

| | | | |
|---|---|---|---|
| 4,243,480 A * | 1/1981 | Hernandez et al. | 162/141 |
| 6,168,686 B1 | 1/2001 | Sutman et al. | |
| 6,602,994 B1 * | 8/2003 | Cash et al. | 536/30 |
| 2004/0127869 A1 | 7/2004 | Hu et al. | |

FOREIGN PATENT DOCUMENTS

| | | |
|---|---|---|
| EP | 0 308 752 A2 | 3/1989 |
| EP | 0 752 496 B1 | 10/2001 |
| FI | 119481 B1 | 11/2008 |
| JP | 2009-096834 A | 5/2009 |
| JP | 2010-209510 A | 9/2010 |
| WO | WO 2007/016547 A2 | 2/2007 |
| WO | WO 2009/084566 | 7/2009 |

OTHER PUBLICATIONS

International Search Report for corresponding International Patent Application No. PCT/FI2011/050789 mailed Jan. 2, 2012.
Finnish Search Report for corresponding Finnish Patent Application No. 20105959 mailed Mar. 23, 2011.
Taipale T, et al. "Effect of microfibrillated cellulose and fines on the drainage of kraft pulp suspension and paper strength", Cellulose, vol. 17, No. 5, 2010, pp. 1005-1020.
CHEMNET, CAS; The properties of Dimethyl di(hydrogenated tallow) ammonium chloride [online], [retrieved on Dec. 28, 2011]. Internet address: http://www.chemnet.com/cas/en/61789-80-8; 56573-48-9; 59249-59-1; 60569-67-7; 62112-31-6; 66419-31-6;66455-24-1/Varisoft-442-100P.html.
Ovaska, S. "Dewatering of Hard-to-Dewater Pulps", Master's Thesis, Lappeenranta University of Technology, Faculty of Technology, Department of Chemical Engineering, Lappeenranta, May 2010.
Wagberg, L. et al. "Kinetics of Polyelectrolyte Adsorption on Cellulosic Fibers", Langmuir, vol. 17, 2001, pp. 1096-1103.

* cited by examiner

*Primary Examiner* — Mark Halpern
(74) *Attorney, Agent, or Firm* — Merchant & Gould P.C

(57) ABSTRACT

The invention relates to a method for improving the removal of water in a composition containing microfibrillated cellulose. According to the invention, a cationic polyelectrolyte that has a low molecular weight and a molecular weight of less than 10000 is provided in the composition containing microfibrillated cellulose.

17 Claims, 4 Drawing Sheets

METHOD FOR IMPROVING THE REMOVAL OF WATER

Figure 1:
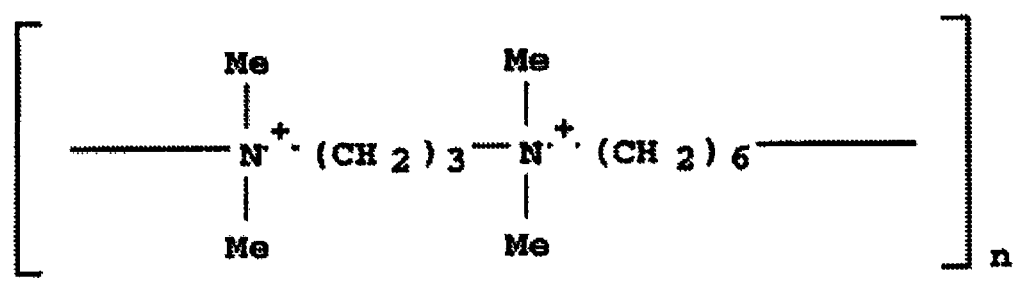

This application is a National Stage Application of PCT/FI2011/050789, filed 14 Sep. 2011, which claims benefit of Serial No. 20105959, filed 17 Sep. 2010 in Finland and which applications are incorporated herein by reference. To the extent appropriate, a claim of priority is made to each of the above disclosed applications.

FIELD OF THE INVENTION

The invention relates to a method as defined in the preamble of claim 1 for improving the removal of water in a composition containing microfibrillated cellulose.

BACKGROUND OF THE INVENTION

Known from the prior art are different methods for the manufacture of pulp and paper products.

In addition, it is known from the prior art to improve the properties of paper products by different filling and coating agents, e.g. pigments, in connection with papermaking. It is known that, in papermaking, the aim is to provide the best possible properties for the paper product.

On the other hand, it is known from the prior art to manufacture microfibrillated cellulose and to use it in the manufacture of pulp and paper products. In studies concerning microfibrillated cellulose, it has been found that, among other things, microfibrillated cellulose improves the strength of paper. Microfibrillated cellulose has a large specific surface area and has thereby a large bonding area relative to the material weight. A problem in using microfibrillated cellulose for improving the properties of paper is its high water retentivity and thereby a high water content. Transportation of microfibrillated cellulose having a high water content is neither economical nor ecological. In addition, the removal of water from microfibrillated cellulose or from pulp and paper containing microfibrillated cellulose has been difficult and limited to a certain level of dry matter content.

OBJECTIVE OF THE INVENTION

The objective of the invention is to remedy the above-mentioned problems in connection with the manufacture of paper products and to disclose a new type of a method for improving the removal of water in a composition containing microfibrillated cellulose.

SUMMARY OF THE INVENTION

The method according to the invention is characterized by what has been presented in the claims.

The invention is based on a method for improving the removal of water in a composition containing microfibrillated cellulose. According to the invention, a cationic polyelectrolyte that has a low molecular weight and a molecular weight of less than 10000 is provided in the composition containing microfibrillated cellulose to promote the removal of water from the composition.

Preferably, the composition containing microfibrillated cellulose is provided in the form of an aqueous suspension. The composition may contain microfibrillated cellulose in the range of more than 0% to less than 100 w-%.

The invention is specifically based on the use of a small cationic polyelectrolyte and thereby on the facilitation of the removal of water from a composition containing microfibrillated cellulose. It is known that large polyelectrolytes promote the formation of a network in a composition containing microfibrillated cellulose, which is often disadvantageous for the removal of water. In connection with the invention, it has surprisingly been found that the removal of water can be facilitated by using cationic polyelectrolytes that are sufficiently small. Preferably, the addition of a small cationic polyelectrolyte affects the structural and surface chemical properties of the network formed by the composition containing microfibrillated cellulose. This way, water is more easily removable.

In one embodiment of the invention, water is removed from the composition containing microfibrillated cellulose provided with the cationic polyelectrolyte using a predetermined water removal technique. In one embodiment, the water removal technique may have been selected from the group of: filtration, thickening, sedimentation, pressure, gravimetric methods, underpressure methods, overpressure methods, vacuum-based methods and their various combinations.

Microfibrillated cellulose in this context signifies cellulose consisting of microfibrils, i.e. a set of isolated cellulose microfibrils or microfibril bundles derived from cellulose raw material. Cellulose fibers contain microfibrils that are filamentous constituents of cellulose fibers. A cellulose fiber is made fibrous by fibrillating. The aspect ratio of microfibrils is typically high; the length of individual microfibrils may be more than one micrometer and the number-average diameter is typically less than 20 nm. The diameter of microfibril bundles may be greater but usually less than 1 µm. The smallest microfibrils are similar to the so-called elemental fibrils, the diameter of which is typically 2 to 4 nm. The dimensions and structures of microfibrils or microfibril bundles depend on the raw material and the manufacturing method.

Microfibrillated cellulose may be formed from any botanical raw material, e.g. wood-based raw material, such as hardwood raw material or softwood raw material, or other botanical raw material that contains cellulose. Botanical raw materials may include e.g. agricultural waste, grasses, straw, bark, caryopses, peels, flowers, vegetables, cotton, maize, wheat, oat, rye, barley, rice, flax, hemp, abaca, sisal, kenaf, jute, ramie, bagasse, bamboo or reed or different combinations thereof.

Microfibrillated cellulose may also contain hemicellulose, lignin and/or extractive agents, the amount of which depends on the employed raw material. Microfibrillated cellulose is isolated from the above-described raw material containing cellulose with an apparatus suitable for the purpose, e.g. a grinder, comminutor, homogenizer, fluidizer, micro- or macrofluidizer, cryo crushing and/or ultrasonic disintegrator. Microfibrillated cellulose may also be obtained directly by a fermentation process using microorganisms e.g. from the genera *Acetobacter, Agrobacterium, Rhizobium, Pseudomonas* or *Alcailgenes*, preferably the genera *Acetobacter* and most preferably the species *Acetobacter xylinum* or *Acetobacter pasteurianus*. Raw materials of microfibrillated cellulose may also include for example tunicates (Latin: tunicata) and organisms belonging to chromalveolate groups (Latin: chromalveolata), e.g. oomycetes (Latin: oomycete), that produce cellulose.

In one embodiment, microfibrillated cellulose may be any chemically or physically modified derivative of cellulose consisting of microfibrils or microfibril bundles. Chemical modification may be based e.g. on a carboxy-methylation, oxidation, esterification and etherification reaction of cellulose molecules. The modification may also be carried out by physical adsorption of anionic, cationic or non-ionic materials or combinations thereof to the surface of cellulose. The modification may be performed before, during or after the manufacture of microfibrillated cellulose.

Microfibrillated cellulose may be formed by any manner known per se in the art from cellulose-based raw material. In one embodiment, a mixture composition containing microfibrillated cellulose is formed from dried and/or concentrated cellulose raw material by fibrillating. In one embodiment, the cellulose raw material is concentrated. In one embodiment, the cellulose raw material is dried. In one embodiment, the cellulose raw material is dried and concentrated. In one embodiment, the cellulose raw material is chemically preprocessed to disintegrate more easily, i.e. labilized, whereby the mixture composition containing microfibrillated cellulose is formed from chemically labilized cellulose raw material. For example, a N-oxyl (e.g. 2,2,6,6-tetramethyl-1-piperidine N-oxide) mediated oxidation reaction provides very labile cellulose raw material which is exceptionally easy to disintegrate into microfibrillated cellulose. This type of chemical pre-processing is described for example in patent applications WO 09/084566 and JP 20070340371.

The fibrils of microfibrillated cellulose are fibers which are very long relative to the diameter. Microfibrillated cellulose has a large specific surface area. Thus, microfibrillated cellulose is able to form many bonds and bind many particles. In addition, microfibrillated cellulose has good strength properties.

In one embodiment, microfibrillated cellulose is at least partially or mainly nanocellulose. Nanocellulose consists at least mainly of nanosize-class fibrils, the diameter of which is less than 100 nm, but the length may be within the μm-size class or smaller. Alternatively, microfibrillated cellulose may also be referred to as nanofibrillated cellulose, nanofibril cellulose, nanofibers of cellulose, nanoscale fibrillated cellulose, microfibril cellulose or microfibrils of cellulose. Preferably, microfibrillated cellulose in this context does not mean the so-called cellulose nanowhiskers or microcrystalline cellulose (MCC).

In one embodiment, the composition containing microfibrillated cellulose may be provided in the form of a dispersion, e.g. in a gel or gelatinous form, or in the form of a diluted dispersion, or in the form of a suspension, i.e. an aqueous suspension.

In one embodiment, the composition may consist mainly of microfibrillated cellulose.

In one embodiment of the invention, the composition is a fiber mixture containing microfibrillated cellulose. In addition to microfibrillated cellulose, the fiber mixture contains other suitable fibers and/or different additives and/or fillers. In one embodiment, fibers of the fiber mixture may be formed from any botanical raw material.

In one embodiment of the invention, a cationic polyelectrolyte is added to the composition containing microfibrillated cellulose. In one embodiment, the cationic polyelectrolyte is added to the fiber mixture containing microfibrillated cellulose.

In one embodiment of the invention, the cationic polyelectrolyte is first added to the fiber composition, and then the microfibrillated cellulose is added to the composition to form the fiber mixture.

In one embodiment of the invention, the cationic polyelectrolyte is added to the composition containing microfibrillated cellulose, e.g. an aqueous suspension, and the composition thus formed is added to the fiber composition to form the fiber mixture.

In this context, the fiber composition means any fiber-based composition or pulp that may be formed from any botanical raw material, e.g. wood-based raw material, such as hardwood raw material or softwood raw material, or other plant raw material that contains fibers, such as cellulose fibers. The fiber composition may be fiber-based pulp formed by a chemical method wherein fibers are separated from each other and most of the lignin is removed by chemicals using a chemical method that may be e.g. a sulfate process, sulfite process, soda process, a process based on organic solvents or other chemical treatment method known per se in the art. The fiber composition may be fiber-based pulp formed by a mechanical method, for example TMP, PGW, CTMP or the like.

In one embodiment of the invention, a water removal treatment is performed substantially in one step to remove water from the composition containing microfibrillated cellulose.

In one embodiment of the invention, the water removal treatment is performed in at least two steps to remove water from the composition containing microfibrillated cellulose. In one embodiment, the water removal treatment is performed in two steps. In one embodiment, the water removal treatment is performed in more than two steps.

In one embodiment of the invention, the employed cationic polyelectrolyte is a mixture that contains at least one cationic polyelectrolyte that has a low molecular weight and a molecular weight of less than 10000. In one embodiment, the mixture of the cationic polyelectrolyte contains one cationic polyelectrolyte, in one embodiment more than one cationic polyelectrolyte. In addition, the mixture may contain other suitable material components.

In one embodiment of the invention, the employed cationic polyelectrolyte is substantially water soluble.

In one embodiment, the employed cationic polyelectrolyte has a high charge density, e.g. >4 meq/g.

In one embodiment of the invention, the employed cationic polyelectrolyte has a DS, i.e. degree of substitution, in other words the portion of charged monomer sequences of all monomer sequences, of between 0.3 and 1.

In one embodiment, the employed cationic polyelectrolyte has a high methyl group content.

In one embodiment of the invention, the cationic polyelectrolyte is selected from the group of polybrene, cationic starch and their different mixtures. Also other cationic polyelectrolyte chemicals suitable for the purpose may be used. In one embodiment, the employed cationic polyelectrolyte is polybrene alone or in a mixture with another polyelectrolyte and/or suitable material components. Polybrene is poly[(dimethyliminio)-1,3-propanediyl(dimethyliminio)-1,6-hexanediyl bromide (1:2)]. In one embodiment, the employed cationic polyelectrolyte is cationic starch alone or in a mixture with another polyelectrolyte and/or suitable material components. In one embodiment, the cationic chemical may be any cationic chemical that has a low molecular weight and a molecular weight of less than 10000. In one embodiment, the employed cationic polyelectrolyte is a linear cationic polyelectrolyte.

In one embodiment of the invention, the cationic polyelectrolyte is used in a stoichiometric excess relative to the amount of microfibrillated cellulose.

In one embodiment of the invention, the method is used in the manufacture of a fiber suspension which contains microfibrillated cellulose and from which water is removed by the method according to the invention.

In one embodiment of the invention, the method is used in the manufacture of pulp.

In one embodiment of the invention, the method is used in the manufacture of paper. The method according to the invention may be applied for use in the manufacture of different paper products, wherein the paper product is formed from fiber-based material. The paper product in this context signifies any fiber-based paper, board or fiber product or an equivalent product. The paper product may be formed from chemical pulp, mechanical pulp, chemi-mechanical pulp, recycled pulp, fiber pulp and/or botanical pulp. The paper product may contain suitable fillers and additives as well as different surface treatment and coating agents.

In one embodiment of the invention, the method is used in the manufacture of a product containing microfibrillated cellulose, e.g. in the manufacture of different compositions and mixtures, preferably in the manufacture of thickened compositions and mixtures, in the manufacture of different films, in the manufacture of different composite products or in equivalent cases. In one embodiment, the method is used in the manufacture of a product mainly containing microfibrillated cellulose, such as in the manufacture of a thickened microfibril cellulose suspension or in the manufacture of films formed from microfibrillated cellulose.

The invention provides important advantages as compared with the prior art.

Thanks to the invention, the removal of water from a composition containing microfibrillated cellulose can be improved, i.e. the degree of water removal and dry matter content of the composition can be increased and the removal of water can be speeded up.

The invention provides savings in terms of energy, raw material and labor expenditure. In addition, the invention provides a significant economical benefit in terms of transportation. In addition, the invention provides for better utilization of microfibrillated cellulose in different applications of use.

The method according to the invention is easily industrially applicable.

LIST OF FIGURES

Figure 2:
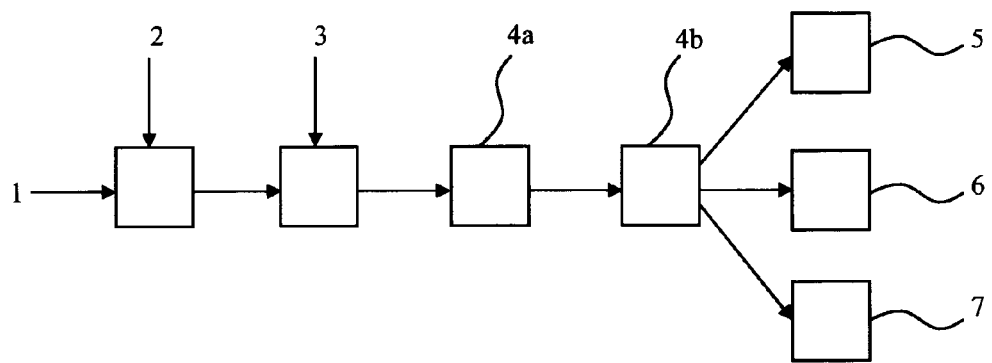
Figure 3:
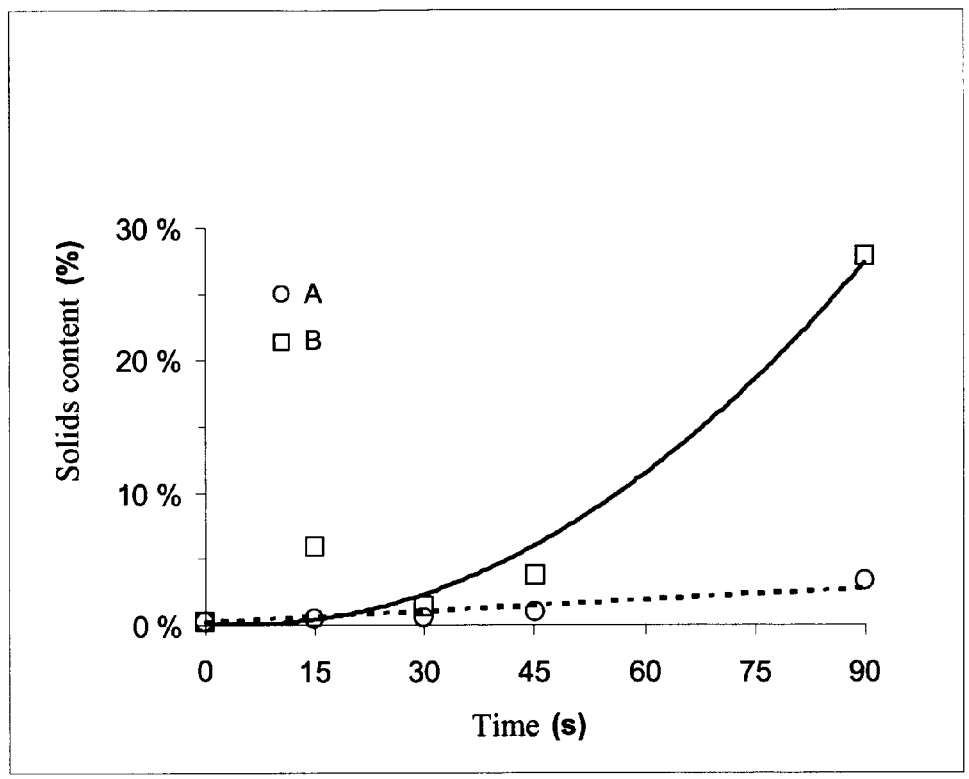
Figure 4:
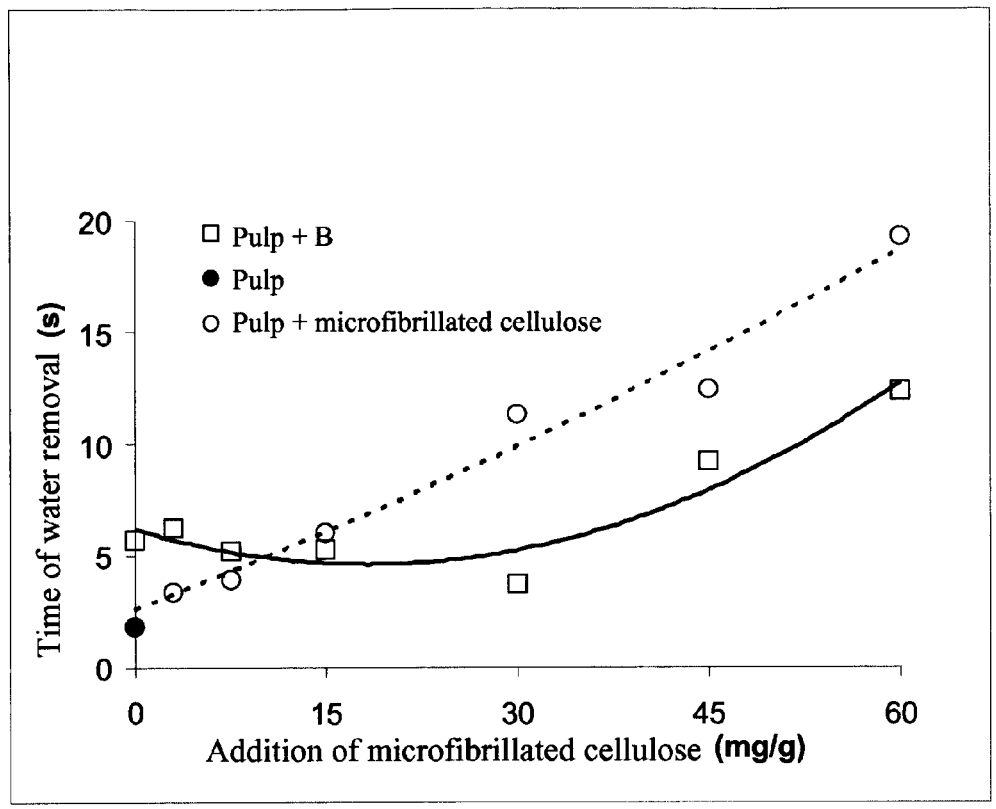

FIG. 1 shows the structure of polybrene,

FIG. 2 presents a simplified flow chart for carrying out one method according to the invention, FIG. 3 shows the effect of the addition of a cationic polyelectrolyte and time on the solid matter content of microfibrillated cellulose, and FIG. 4 presents the effect of the addition of microfibrillated cellulose and a cationic polyelectrolyte on the time of water removal from pine kraft pulp.

DETAILED DESCRIPTION OF THE INVENTION

The invention will be described in more detail with the aid of the accompanying examples and with reference to the accompanying figures.

Example 1

FIG. 2 illustrates the procedure of one method according to the invention as a simplified diagram.

In the method illustrated in FIG. 2, there is formed a fiber product containing microfibrillated cellulose from which water is removed. Microfibrillated cellulose 2 is first added to the fiber composition followed by a cationic polyelectrolyte 3. The employed cationic polyelectrolyte is polybrene, the structure of which is presented in FIG. 1 and which has a low molecular weight and a molecular weight of less than 10000. Water is removed from the fiber mixture thus formed by a two-step water removal device 4a,4b based on microfiltration. The fiber mixture from which water has been removed is led to the manufacture of a fiber suspension 5 or pulp 6 or to the manufacture of a product 7 containing microfibrillated cellulose.

Example 2

A suspension composition containing microfibrillated cellulose was formed with a dry matter content of 0.2%.

2 different series of samples were formed from the suspension, wherein a cationic polyelectrolyte was not added to the first samples A and polybrene 10 mg/g as the cationic polyelectrolyte was added to the second samples B. The chemical structure of polybrene is presented in FIG. 1. The pH of the samples was approximately 8.

The samples were microfiltered using a 5 μm membrane and an overpressure of 0.5 bar to remove water by dead-end filtration. The dry matter content in samples A was approximately 2%. For samples B, a dry matter content of approximately 30% was obtained in similar conditions. It was discovered that the rate of water removal was also increased with samples B. FIG. 3 presents the effect of the addition of the cationic polyelectrolyte on the solid matter content of microfibrillated cellulose.

Example 3

A composition according to sample B according to Example 2 containing microfibrillated cellulose and 9 mg/g of a cationic polyelectrolyte was added to pulp by 0 to 6%. The employed pulp was pine kraft pulp with pulp consistency of 0.3% and a pH of approximately 8. It was discovered that the removal of water from the pulp was improved relative to a condition where microfibrillated cellulose but not a cationic polyelectrolyte had been added to the pulp, or where neither microfibrillated cellulose nor a cationic polyelectrolyte had been added to the pulp.

FIG. 4 presents the effect of the addition of microfibrillated cellulose and/or a cationic polyelectrolyte on the time of water removal from pine kraft pulp. The figure shows that the time of water removal was reduced when a cationic polyelectrolyte had been added to the pulp in addition to microfibrillated cellulose.

The removal of water was carried out using a pressure difference of 0.15 bar with underpressure filtration and a 200 mesh screen. The filtration was a dead end type filtration.

In addition, it was discovered in the tests that the wet strength was increased when the composition according to sample B was added to pulp, in comparison with conventional pulp without addition of microfibrillated cellulose.

It the tests, it was discovered that facilitation of the removal of water is provided by the cationic nature of the polyelectrolyte and the optimum molecular mass.

The method according to the invention is applicable as different embodiments for use in the manufacture of most different kinds of cellulose-based products.

The invention is not limited merely to the example referred to above; instead, many variations are possible within the scope of the inventive idea defined by the claims.

The invention claimed is:

1. A method for improving the removal of water in a composition containing microfibrillated cellulose, the method comprising:
   providing a cationic polyelectrolyte in the composition containing microfibrillated cellulose, wherein the cationic polyelectrolyte has a molecular weight of less than 10000.

2. The method according to claim 1, wherein water is removed from the composition containing microfibrillated cellulose using a predetermined water removal technique.

3. The method according to claim 1, wherein the composition is a fiber mixture containing microfibrillated cellulose.

4. The method according to claim 1, wherein a cationic polyelectrolyte is added to the composition containing microfibrillated cellulose.

5. The method according to claim 1, wherein the cationic polyelectrolyte is first added to a fiber composition and microfibrillated cellulose is then added to the composition.

6. The method according to claim 1, wherein the cationic polyelectrolyte is added to the composition containing microfibrillated cellulose, which is then added to a fiber composition.

7. The method according to claim 1, wherein a water removal treatment is performed substantially in one step to remove water from the composition containing microfibrillated cellulose.

8. The method according to claim 1, wherein a water removal treatment is performed in at least two steps to remove water from the composition containing microfibrillated cellulose.

9. The method according to claim 1, wherein the employed cationic polyelectrolyte is a mixture that contains at least one cationic polyelectrolyte that has a molecular weight of less than 10000.

10. The method according to claim 1, wherein the employed cationic polyelectrolyte is substantially water soluble.

11. The method according to claim 1, wherein the employed cationic polyelectrolyte has a DS of between 0.3 and 1.

12. The method according to claim 1, wherein the cationic polyelectrolyte is selected from the group of polybrene, cationic starch and their mixtures.

13. The method according to claim 1, wherein the cationic polyelectrolyte is used in a stoichiometric excess relative to the amount of microfibrillated cellulose.

14. The method according to claim 1, wherein the method is used in the manufacture of a fiber suspension.

15. The method according to claim 1, wherein the method is used in the manufacture of pulp.

16. The method according to claim 1, wherein the method is used in the manufacture of paper.

17. The method according to claim 1, wherein the method is used in the manufacture of a product containing microfibrillated cellulose.

* * * * *